United States Patent [19]

Hoffman et al.

[11] 4,103,909
[45] Aug. 1, 1978

[54] SEAL FOR A DRIVE JOURNAL OF A BALL VALVE

[75] Inventors: Michael Hoffman; Rolf Pape, both of Berlin, Fed. Rep. of Germany

[73] Assignee: Borsig Gesellschaft mit beschrankter Haftung, Berlin, Fed. Rep. of Germany

[21] Appl. No.: 837,523

[22] Filed: Sep. 29, 1977

[30] Foreign Application Priority Data

Sep. 30, 1976 [DE] Fed. Rep. of Germany ....... 2644419

[51] Int. Cl.² ...................... F16J 15/24; F16K 31/44
[52] U.S. Cl. .................................. 277/101; 277/104; 277/116.2; 277/124; 277/205; 251/214
[58] Field of Search ............... 277/102, 104, 101, 106, 277/116.2, 123–125, 205, 120, 121; 251/214

[56] References Cited

U.S. PATENT DOCUMENTS

| | | | |
|---|---|---|---|
| 2,610,846 | 9/1952 | Hanna | 277/124 X |
| 3,540,740 | 11/1970 | Smith | 251/214 X |
| 3,630,483 | 12/1971 | Canalizo | 251/214 X |
| 3,653,670 | 4/1972 | Sifri et al. | 277/205 X |
| 3,680,874 | 8/1972 | Schwarz | 277/205 X |
| 3,847,389 | 11/1974 | Rogers | 277/205 X |

*Primary Examiner*—Robert S. Ward, Jr.
*Attorney, Agent, or Firm*—Walter Becker

[57] ABSTRACT

A seal for a drive journal of a ball valve. The elements which directly carry out the sealing action are arranged below a thrust collar which is directed against the cover of the ball valve and is displaceable in the axial direction with the aid of set screws which extend through the cover. The sealing ring is a U-ring which abuts the thrust collar and the walls of the drive journal and the housing. The U-ring is provided with an annular slot which is open toward a thrust ring and, at its deepest portion, has a metallic compensating ring followed by a spiral ring.

3 Claims, 1 Drawing Figure

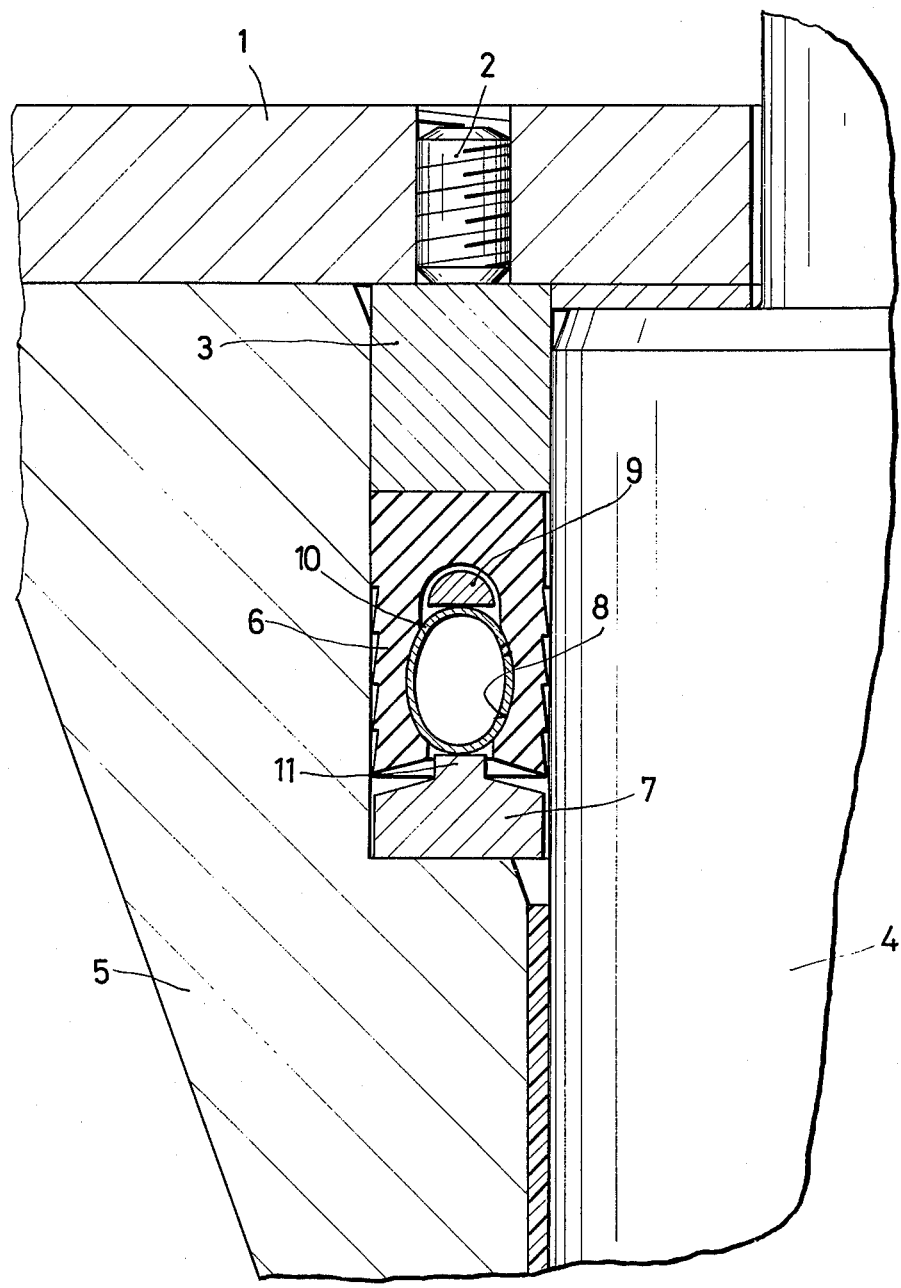

SEAL FOR A DRIVE JOURNAL OF A BALL VALVE

The present invention relates to a seal for a drive journal of a ball valve, according to which the elements which directly carry out the sealing action are arranged below a thrust collar which is directed against the cover of the ball valve and is displaceable in the axial direction with the aid of set screws which extend through the cover.

Such drive journal seals require a construction and arrangement of the sealing elements which guarantees a good seal between the drive journal and the housing even with an off-center positioning of the drive journal.

It is known to satisfy this requirement by providing so-called cover sleeve-like annular seals with about three to eight sleeves, according to the pressure stage. These seals necessitate a great amount of room and a plurality of parts. With regard to shifts of the drive journal caused by the operating conditions, these seals can accommodate only relatively small deviations from the centered position. The resulting elastic sealing forces of the sleeves are directed at an angle against the walls of the drive journal and the housing, thereby making the smaller radial components of the sleeves operative.

It is therefore an object of the present invention to decrease the space occupied by the seal of the drive journal, to reduce the number of individual parts, and to design the seal in such a way that, with relatively little employment of pressure through the thrust collar, an efficient seal is continually achieved, even with extreme deviations of the drive journal from its centered position.

This object and other objects and advantages of the present invention will appear more clearly from the following specification in connection with the accompanying drawing, which is a longitudinal cut-away section of a ball valve, showing a portion of the drive journal seal pursuant to the present invention.

The drive journal seal pursuant to the present inventon is characterized primarily in that the sealing ring, which is a U-ring and which abuts the thrust collar and the walls of the drive journal and the housing, is provided with a circular slot which is open toward a thrust ring. The slot, at its deepest portion, has a metallic compensating ring followed by a spiral spring.

In order to prevent the U-ring, especially with high pressure ball valves, from being damaged as a result of the strong axial pressure load of the drive journal seal, the compensating ring, pursuant to a further embodiment of the present invention, has an approximately semicircular cross section, the rounded portion of which is encircled by the sealing material of the U-ring, while the flat side contacts the spiral spring.

In order, if necessary, to have available a particularly broad adjustment possibility for the drive journal seal, the present invention provides that the spiral spring is laterally inserted against the sealing material under preload and has an elliptical cross section, the major axis of which extends parallel to the central axis of the drive journal. The annularly extending flange of the thrust ring, which flange has a rectangular cross section, projects into the slot of the U-ring and continually contacts the spiral spring.

Referring now to the drawing in detail, the set screws 2, which are arranged in a circle, act, through the cover 1 of the ball valve, upon the thrust collar 3 of the drive journal seal in such a way that the thrust collar 3 is axially displaceable. The U-ring or groove ring 6 with a wall of U-shaped cross section has its slot 8 directed toward the thrust ring 7 and is located below the thrust collar 3 and between the walls of the drive journal 4 (of the not shown valve or stop cock) and the housing 5. The compensating ring 9, which has a semicircular cross section, is inserted in the base of the slot 8 in such a way that its rounded portion is encircled by the sealing material of the U-ring 6, while its flat side contacts the spiral spring 10. On its opposite side, the spiral spring 10 contacts the annularly extending flange 11 of the thrust ring 7, which flange 11 has a rectangular cross section, during all conceivable settings of the drive journal seal.

The spiral spring 10 comprises a wide, thin-walled spring steel band. The thrust collar 3 is made of steel, as is the thrust ring 7. The U-ring 6 comprises PTFE with glass fiber and $MoS_2$.

The advantages achieved with the present invention consist especially in a drive journal seal which requires little space, comprises few individual parts, accommodates considerable deviations of the drive journal from its centered position without losing its seal, and which exhibits a particularly good sealing action, without extremely great pressures by the set screws upon the thrust collar, by directing the resulting pressures radially against the walls of the drive journal and the housing.

It is, of course, to be understood that the present invention is by no means limited to the specific showing in the drawing but also encompasses any modifications within the scope of the appended claims.

What we claim is:

1. A seal for a drive journal of a ball valve, which comprises:
   a housing which accommodates said drive journal;
   a cover, located on said housing, through which a portion of said drive journal juts;
   an annular thrust collar located in said housing adjacent said drive journal and directed against said cover;
   a plurality of set screws located in said cover and adapted to displace said thrust collar in the axial direction of said drive journal;
   a U-ring which acts as a sealing ring and which abuts the thrust collar and is located between said drive journal and said housing, said U-ring being provided with an annular slot which is open toward that end of said U-ring which is remote from said thrust collar;
   a thrust ring located in said housing at the open end of said slot;
   a metallic compensating ring located in the deepest portion of said slot; and
   an annular spiral spring located in said slot between said compensating ring and said thrust ring.

2. A seal according to claim 1, in which said compensating ring has an approximately semicircular cross section, the rounded portion of which is surrounded by said U-ring, while the flat portion contacts said spiral spring.

3. A seal according to claim 1, in which said spiral spring is inserted in said slot of said U-ring under preload and has an elliptical cross section, the major axis of which is substantially parallel to the central longitudinal axis of said drive journal, and in which said thrust ring is provided with an annular flange of rectangular cross section, said flange projecting into said slot while continuously contacting said spiral spring.

* * * * *